(12) United States Patent
Lee

(10) Patent No.: US 6,960,124 B2
(45) Date of Patent: Nov. 1, 2005

(54) CUTTING MACHINE WITH ENVIRONMENT CONTROL ARRANGEMENT

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 50 days.

(21) Appl. No.: 10/354,229

(22) Filed: Jan. 31, 2003

(65) Prior Publication Data

US 2004/0149107 A1 Aug. 5, 2004

(51) Int. Cl.[7] ............................. B24B 55/06; B24D 1/04
(52) U.S. Cl. ...................... 451/456; 125/13.01; 83/100; 55/510
(58) Field of Search ................................ 451/451, 453, 451/456; 125/13.01, 13.03, 23.01, 28; 83/100, 162, 98, 581, 165–167; 310/47, 52, 58, 62; 55/476, 510, 371–373, 379, 380, 361, 368, 436, 434

(56) References Cited

U.S. PATENT DOCUMENTS

| | | | | |
|---|---|---|---|---|
| 4,811,453 A | * | 3/1989 | Lubraniecki | ................. 15/347 |
| 5,171,340 A | * | 12/1992 | Karmel | ......................... 55/429 |
| 5,701,676 A | * | 12/1997 | Itoh | ............................. 83/170 |
| 5,931,072 A | * | 8/1999 | Shibata | .......................... 83/98 |
| 6,470,778 B1 | * | 10/2002 | Kaye et al. | ................... 83/100 |
| 6,599,348 B2 | * | 7/2003 | Chosnek et al. | .............. 55/416 |

* cited by examiner

Primary Examiner—Hadi Shakeri
(74) Attorney, Agent, or Firm—Raymond Y. Chan; David and Raymond

(57) ABSTRACT

A cutting machine includes a bottom collecting tray, a cutting blade overhanging on a cutting table and having a cutting area defined at an outer circumferential portion thereof when the cutting blade cuts the work piece, and an environment control arrangement. The environment control arrangement includes an end collecting tray, which is upwardly extended from the bottom collecting tray, having a collecting chamber for collecting residual particles of the work piece while the cutting blade cuts the work piece, wherein the end collecting tray must be upwardly extended to a position above the cutting area of the cutting blade, and a suction source having a sucking inlet provided at a lower portion of the end collecting tray for collecting the residual particles within the collecting chamber by means of sucking effect.

12 Claims, 8 Drawing Sheets

CUTTING MACHINE WITH ENVIRONMENT CONTROL ARRANGEMENT

BACKGROUND OF THE PRESENT INVENTION

1. Field of Invention

The present invention relates to a cutting machine, and more particularly to a cutting machine with an environment control arrangement which is capable of effectively collecting the residual particles during the cutting process so as to reduce the pollution of spitting out of the residual particles and to prevent the motor from sucking the residual particles thereinto.

2. Description of Related Arts

Conventional cutting machines are widely used in various industries for provision of rapid and high quality cutting of such construction and manufacturing materials as granite, marble, slate, pave, brick, ceramics, and masonry. A conventional cutting machine generally comprises a supporting frame, a cutting platform slidably mounted on the supporting frame, and a cutter head which is movably overhung on top of the cutting platform and comprises a cutting blade driven by a motor to cut a work piece laid and fixed on the cutting platform.

In order to effectively cut the work piece, the motor must provide a higher horsepower to drive the cutting blade to rotate. Therefore, the rotational force of the cutting blade can cut the work piece with a sharp edge. However, residual particles are formed while the cutting blade is rotatably cutting on the work piece, wherein the rotational force of the cutting blade will spit the residual particles everywhere.

It is worth mentioning that in order to cut the work piece, a cutting area of the cutting blade must be penetrated through the work piece, wherein the cutting area is defined at an outer circumferential portion of the cutting blade to incise the work piece.
In other words, the width of the cutting area of the cutting blade must be smaller than the radius of the cutting blade.

FIG. 1 illustrates that when the cutting area of the cutting blade is penetrated through the work piece, the rotational force of the cutting blade will mainly spit the residual particles rearwardly. Accordingly, the residual particles will not only be spit on the entire supporting frame but also be spit out of the cutting platform. Even though a bottom tray is capable of partially collecting the residual particles, most of the residual particles are spread at the surroundings. Therefore, the residual particles is considered as one of the air pollutions and is hazardous for the user since the residual particles may enter into the user's body during inhalation.

Moreover, in order to maintain a higher rotational speed of the cutting blade, the cutting machine must be designed to suck the air from outside to cool down the relatively high temperature of the motor. General speaking, the motor has a plurality of ventilating holes provided on a casing so that air from outside can be sucked into the casing by a cooling fan through the ventilating holes to achieve the cooling effect. However, the residual particles will also be sucked into the motor with air through the ventilating holes during operation. Therefore, the motor may be burned or permanent damage while the residual particles gradually accumulates to the motor.

For the environmental concern, we want to have a control of air and land pollution to save out lives. However, the making of the residual particles during the cutting process cannot be avoided. Therefore, a solution must be find out to prevent not only the motor get burnt from sucking the residual particles thereinto but also the residual particles spitting out to hazard our health.

SUMMARY OF THE PRESENT INVENTION

A main object of the present invention is to provide a cutting machine with an environment control arrangement which can effectively collect the residual particles when the work piece is cut by the cutting blade, so as to avoid the air and land pollution.

Another object of the present invention is to provide a cutting machine with an environment control arrangement which comprises an end collecting tray upwardly extended from a bottom collecting tray of the cutting machine for preventing the residual particles from spreading out of the cutting machine.

Another object of the present invention is to provide a cutting machine with an environment control arrangement, wherein the cutting machine does not require to alter the original design in order to incorporate the environment control arrangement with the cutting machine, so as to minimize the manufacturing cost of the bottom collecting tray with the end collecting tray.

Another object of the present invention is to provide a cutting machine with an environment control arrangement, wherein an inlet of a suction source is provided on the end collecting tray to effectively collect the residual particles so as to prevent the residual particles entering into the user's body during inhalation.

Another object of the present invention is to provide a cutting machine with an environment control arrangement, wherein an air intake structure of a motor assembly of the cutting machine can prevent the residual particles from entering into the motor assembly so as to prevent the motor assembly get burnt or permanent damage by the residual particles.

Another object of the present invention is to provide a cutting machine with an environment control arrangement, wherein the motor assembly is capable of increasing both air sucking effect and cooling effect by circulating the intake fresh air and discharging hot air.

Another object of the present invention is to provide a cutting machine with an environment control arrangement, wherein the air intake structure is adapted to be incorporated to all kinds of motor assembly.

Accordingly, in order to accomplish the above objects, the present invention provides a cutting machine, comprising:

a cutting support frame comprising a bottom collecting tray and a cutting table mounted thereon for supporting a work piece;

a motor assembly, which is supported on the bottom collecting tray, comprising a driving motor and a driving shaft extended therefrom being driven to be rotated by the driving motor;

a cutting head arrangement comprising a cutting blade coaxially mounted to the driving shaft at a position overhanging the cutting table, wherein the cutting blade has a cutting area defined at an outer circumferential portion thereof when the cutting blade cuts the work piece; and an environment control arrangement, comprising:

an end collecting tray, which is upwardly extended from the bottom collecting tray, having a collecting chamber for collecting residual particles of the work piece while the cutting blade cuts the work piece, wherein the end collecting tray must be upwardly extended to a position above the cutting area of the cutting blade; and a suction source having a sucking inlet provided at a lower portion of the end collecting tray for collecting the residual particles within the collecting chamber by means of sucking effect.

These and other objectives, features, and advantages of the present invention will become apparent from the following detailed description, the accompanying drawings, and the appended claims.

DETAILED DESCRIPTION OF THE PREFERRED EMBODIMENT

Figure 1:
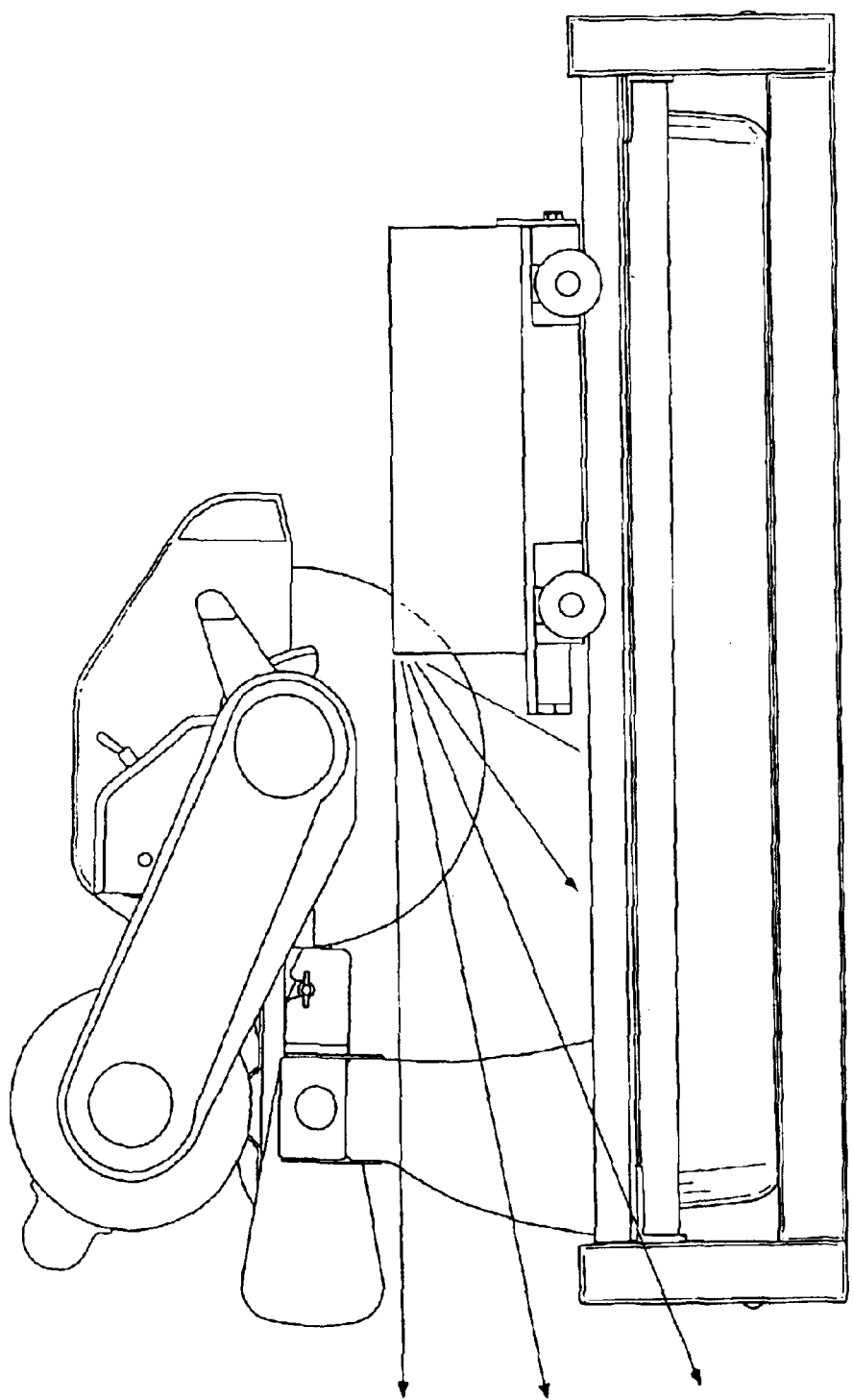
FIG. 1 is a side view of a conventional cutting machine, illustrating the directions of the residual particles spitting out from the work piece.
Figure 2A:
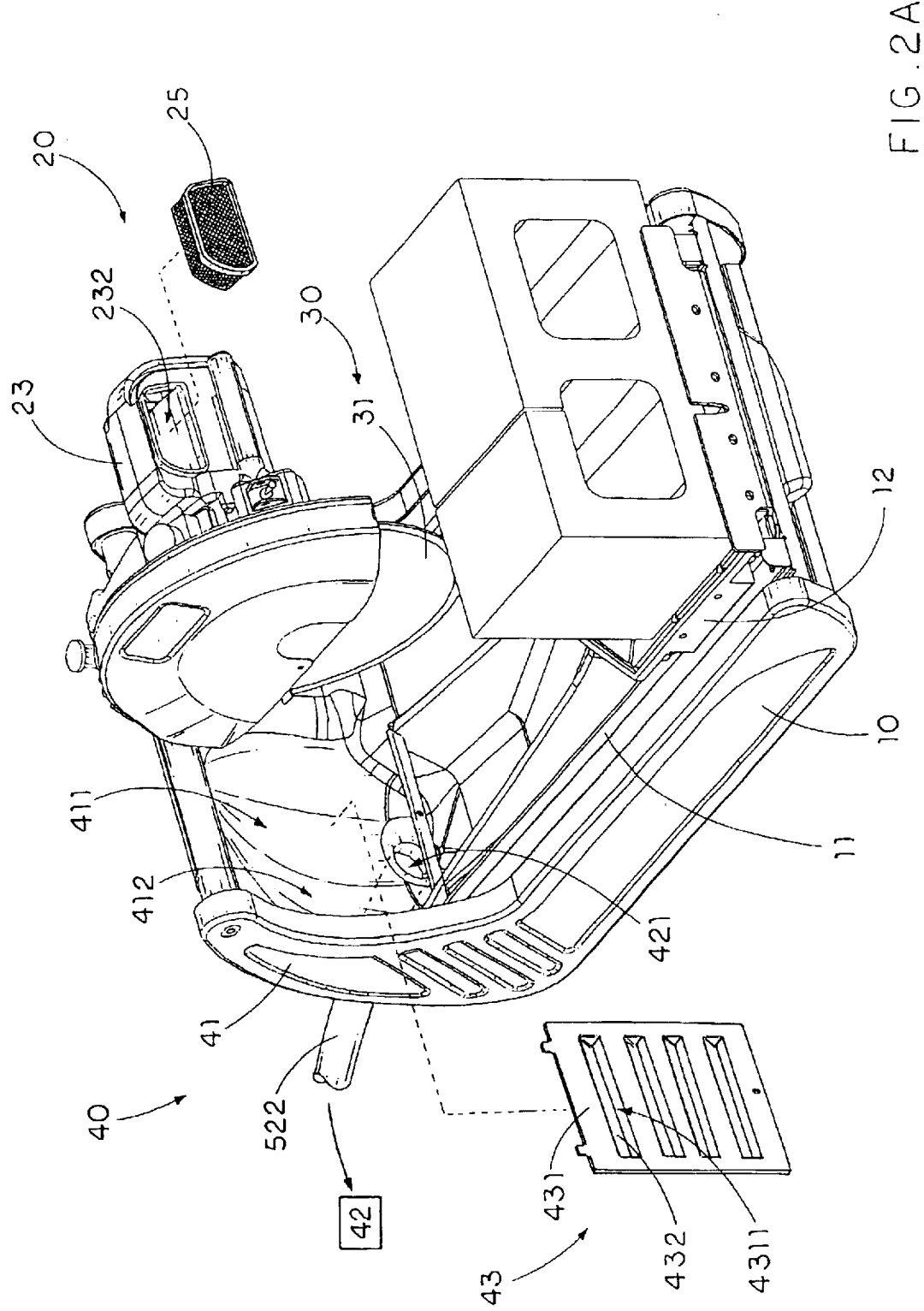
FIGS. 2A and 2B are perspective views of a cutting machine with an environment control arrangement according to a preferred embodiment of the present invention.
Figure 2B:
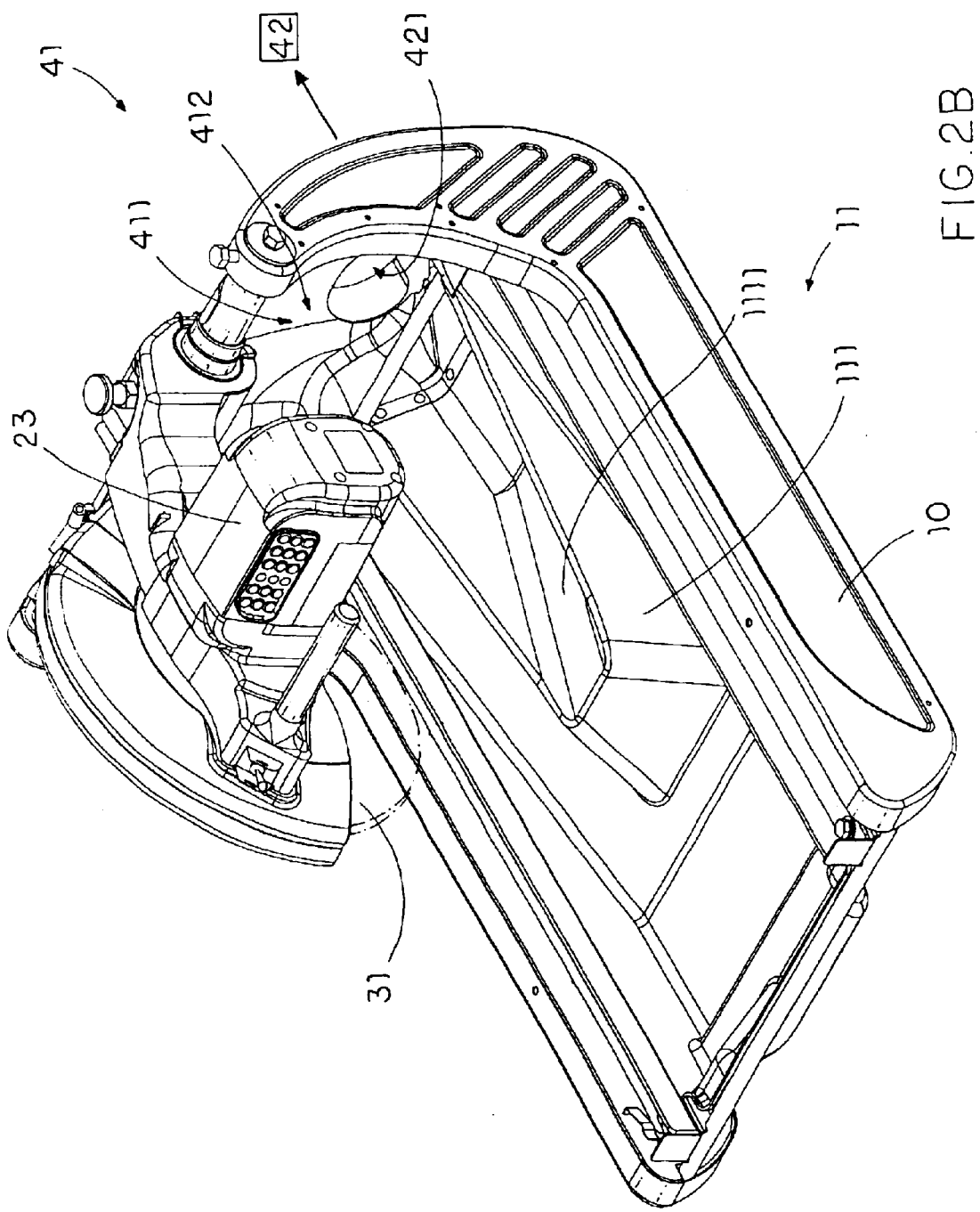
Figure 3:
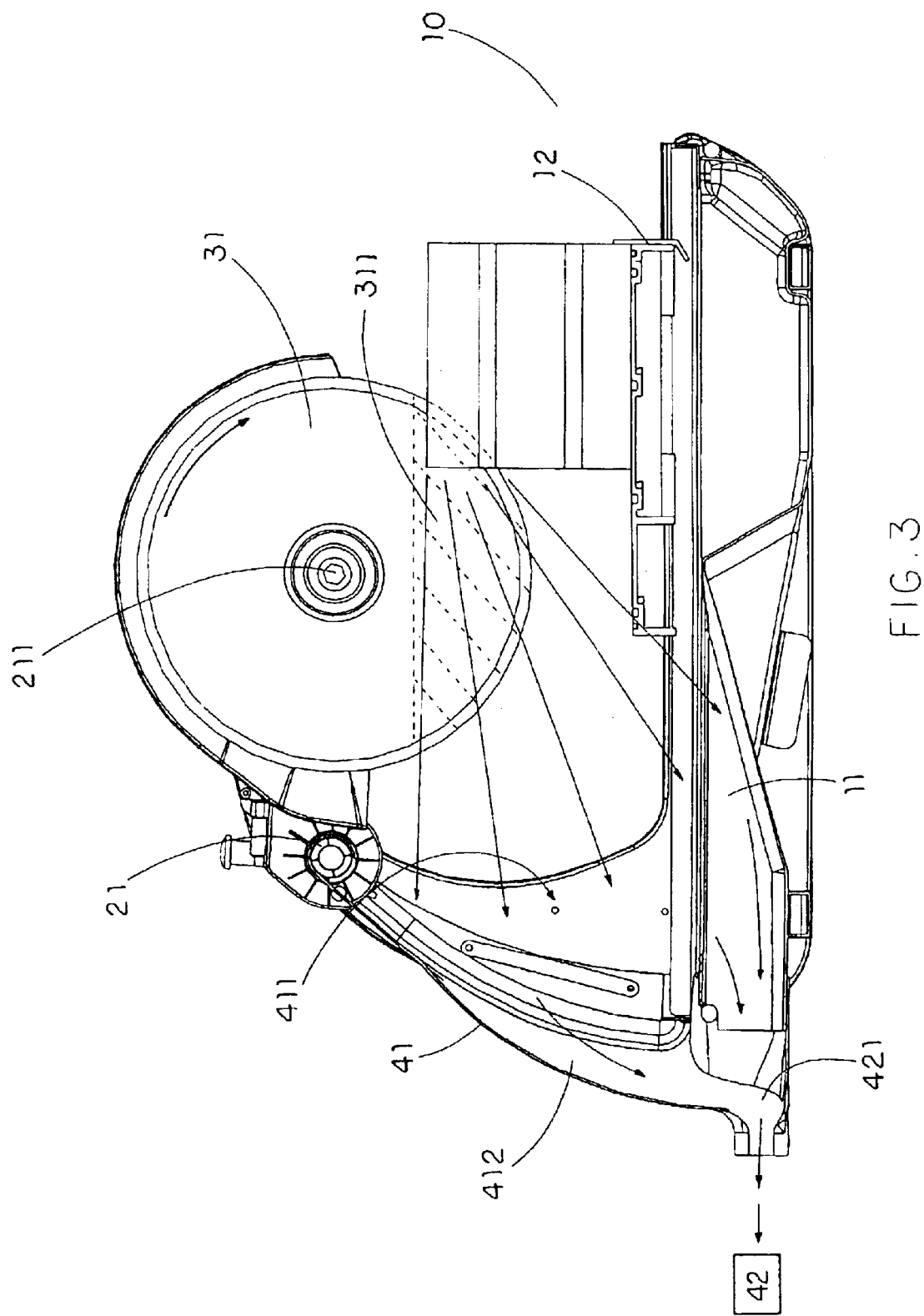
FIG. 3 is a side view of the cutting machine with the environment control arrangement according to the above preferred embodiment of the present invention, illustrating the residual particles being collected within a collecting chamber of the environment control arrangement without a detouring guide mounted thereto.

Referring to FIGS. 2A, 2B and 3 of the drawings, a cutting machine according to a preferred embodiment of the present invention is illustrated, wherein the cutting machine comprises a cutting support frame 10 comprising a bottom collecting tray 11 and a cutting table 12 mounted thereon for supporting a work piece, and a motor assembly 20, which is supported on the bottom collecting tray 11, comprising a driving motor 21 and a driving shaft 211 being driven to be rotated by the driving motor 21.

The cutting machine further comprises a cutting head arrangement 30 comprising a cutting blade 31 coaxially mounted to the driving shaft 211 at a position overhanging the cutting table 12, wherein the cutting blade 31 has a cutting area 311 defined at an outer circumferential portion thereof when the cutting blade 31 cuts the work piece.

The cutting table 12 is slidably mounted on the bottom collecting tray 11 wherein the work piece is placed on the cutting table 12 in such a manner that when the cutting table 12 is slid towards the cutting head arrangement 30, the work piece is cut by the cutting blade 31. During the cutting process, the residual particles are produced and spitted from the work piece, wherein the bottom collecting tray 11 is capable of collecting the residual particles when the residual particles are dropped down from the cutting table 12.

The cutting machine further comprises an environment control arrangement 40 comprising an end collecting tray 41, which is upwardly extended from the bottom collecting tray 11, having a collecting chamber 411 for collecting residual particles of the work piece while the cutting blade 31 cuts the work piece, wherein the end collecting tray 41 must be upwardly extended to a position above the cutting area 311 of the cutting blade 31, and a suction source 42 having a sucking inlet 421 provided at a lower portion of the end collecting tray 41 for collecting the residual particles within the collecting chamber 411 by means of sucking effect.

According to the preferred embodiment, the end collecting tray 41 is securely mounted on a rear end portion of the bottom collecting tray 11 to form a L-shaped member, wherein the end collecting tray 41 has a concave reflecting surface 412 to form the collecting chamber 411 for collectively reflecting the residual particles in such a manner that when the residual particles of the work piece are spitted towards the concave reflecting surface 412, the residual particles are collected within the collecting chamber 411 so as to prevent the residual particles bounce back to the cutting table 12, as shown in FIG. 3.

Alternatively, the end collecting tray 41 can be integrally extended from the bottom collecting tray 11 to form a L-shaped one-piece member so as to strengthen the rigid structure of the cutting support frame 10 of the cutting machine.

As it is mentioned in the background, when the cutting blade 31 cuts the work piece, the cutting area 311 of the cutting blade 31 must be penetrated through the work piece. In other words, the cutting area 311 of the cutting blade 31 is a contact area of cutting blade 31 that contacts with the work piece during cutting process. It is worth mentioning that the residual particles are irregularly spitted out from the work piece towards the bottom collecting tray 11 and the end collecting tray 12 when the cutting area 311 of the cutting blade 31 contacts with the work piece. Therefore, the end collecting tray 41 must be extended from the bottom collecting tray 11 to a position above the cutting area 311 of the cutting blade 31 during the cutting process, so as to block the residual particles spitting out of the collecting chamber 411 of the end collecting tray 41, as shown in FIG. 3.

As shown in FIG. 2B, the bottom collecting tray 11 has a guiding channel 111 protruding upwardly wherein the guiding channel 111 has a slanted bottom side 1111 downwardly extended to the end collecting tray 41 for guiding the residual particles towards the sucking inlet 421. It is worth to mention that lubricant may need during cutting operation of the cutting machine, so that the lubricant with the residual particles will be blocked by the guiding channel 111 and guided to flow towards the end collecting tray 41. In other words, it is impossible to collect all the residual particles far away from the sucking inlet 421 unless a stronger sucking force is applied. Therefore, the guiding channel 111 can substantially guide the residual particles on the bottom collecting tray 11 with a distance from the sucking inlet 421. In addition, even there is no lubricant, the guiding channel 111 is capable of creating an airflow within the bottom collecting tray 11 to guide the residue particulars towards the sucking inlet 421.

Figure 4:
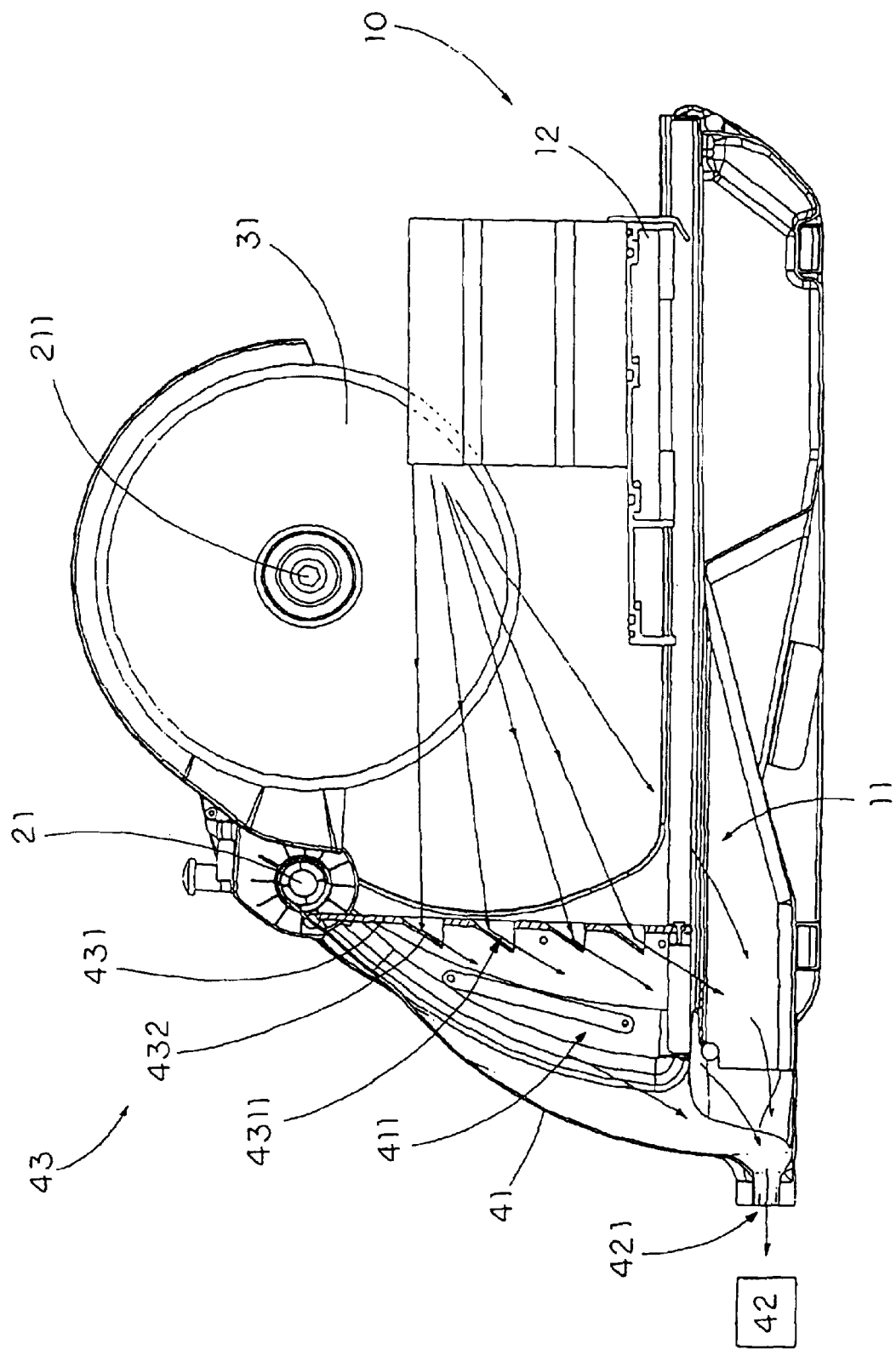
FIG. 4 is a side view of the cutting machine with the environment control arrangement according to the above preferred embodiment of the present invention, illustrating the residual particles being collected within a collecting chamber of the environment control arrangement with a detouring guide mounted thereto.

As shown in FIGS. 2A and 4, the environment control arrangement 40 further comprises a detouring guide 43 for detouring the residual particles towards the sucking inlet 421 of the suction source 42 wherein the detouring guide 43 comprises a guider wall 431, having a plurality of guiding through grooves 4311 provided thereon, detachably mounted at an opening of the collecting chamber 411 of the end collecting tray 41 and a plurality of guiding fins 432 rearwardly and inclinedly extended from the guider wall 431 in such a manner that when the residual particles spit to the collecting chamber 411 through the guiding through grooves 4311, the residual particles are blocked and detoured by the guiding fins 432 towards the sucking inlet 421 of the suction source 42.

Accordingly, each of the guiding fins 432 is formed by cutting three cuts on the guider wall 431 and bending the guiding fins 432 rearwardly and inclinedly. Therefore, the guiding fins 432 are integrally extended from the guider wall 431 at top edges of the guiding through grooves 4311 respectively. Moreover, by adjusting an inclined angle of each of the guiding fins 432 with respect to the guider wall 431, the residual particles are detoured to spit towards the sucking inlet 421 of the suction source 42 when the residual particles hit the guiding fins 432 through the guiding through grooves 4311.

Figure 5:
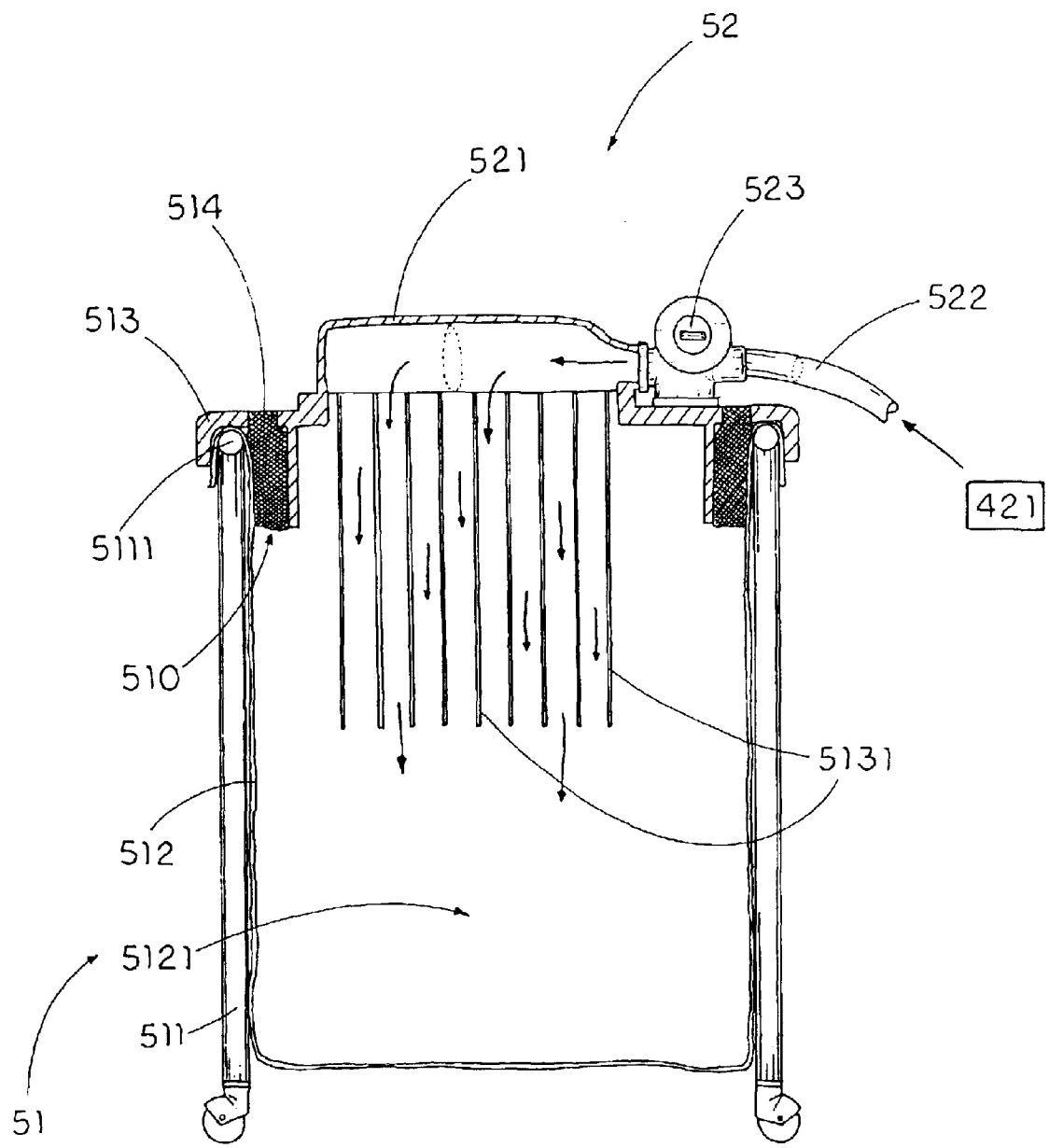
FIG. 5 is a sectional view of a suction source of the environment control arrangement of the cutting machine according to the above preferred embodiment of the present invention.

As shown in FIG. 5, the suction source 42 comprises a collection pen 51 and means 52 for sucking the residual particles from the sucking inlet 421 to the collection pen 51.

The collection pen 51 comprises a standing frame 511 having a top frame 5111, a collecting bag 512 having a top opening supported by the top frame 5111 of the standing frame 511 to define a collection cavity 5121 within the collecting bag 512, and a cover guide 513 which is supported on the top frame 5111 of the standing frame 511 and comprises a plurality of dust guiders 5131 extended downwardly into the collection cavity 5121 in such a manner that when the sucking means 52 sucks the residual particles to the cover guide 513, the residual particles hit the dust guiders 5131 and drop into the collection cavity 5121 of the collection bag 512.

Accordingly, a circumference of the cover guide 513 is smaller than that of the top frame 5111 of the standing frame 511 to define an air gap 510 therebetween for allowing air escaping from the collection cavity 5121 to outside. Moreover, an air filter 514 is mounted at the air gap 510 for filtering the air flowing to outside so as to prevent the residual particles escaping from the collection cavity 5121.

The sucking means 52 comprises a directing cylinder 521 supported on the cover guide 513, an extension hose 522 extended from the sucking inlet 421 to the directing cylinder 521, and a suction motor 523 operatively connected to the extension hose 522 for reducing an air pressure at the sucking inlet 421 such that the residual particles are sucked at the sucking inlet 421 and collected in the collection cavity 5121 through the extension hose 522 and the directing cylinder 521.

Accordingly, a diameter of the extension hose 522 is smaller than that of the directing cylinder 521, in such a manner that a speed of the residual particles is slowed down while entering to the directing cylinder 521 from the extension hose 522. Therefore, once the residual particles are slowed down within the directing cylinder 521, the residual particles hit the dust guiders 5131 and drop into the collection cavity 5121 of the collection bag 512. In other words, no interference by the high speed sucking residual particles occurs within the directing cylinder 521, so as to enhance the collection of the residual particles in the collection cavity 5121 of the collection bag 512.

As it is mentioned in the background, in order to achieve the environment control purpose, the residual particles must be not only stopped from spreading in the air but also prevent from entering into the motor assembly 20. Therefore, the environment control arrangement 40 must comprises the motor assembly 20 which prevent the residual particles from entering thereinto to damage the driving motor 21.

Figure 6:
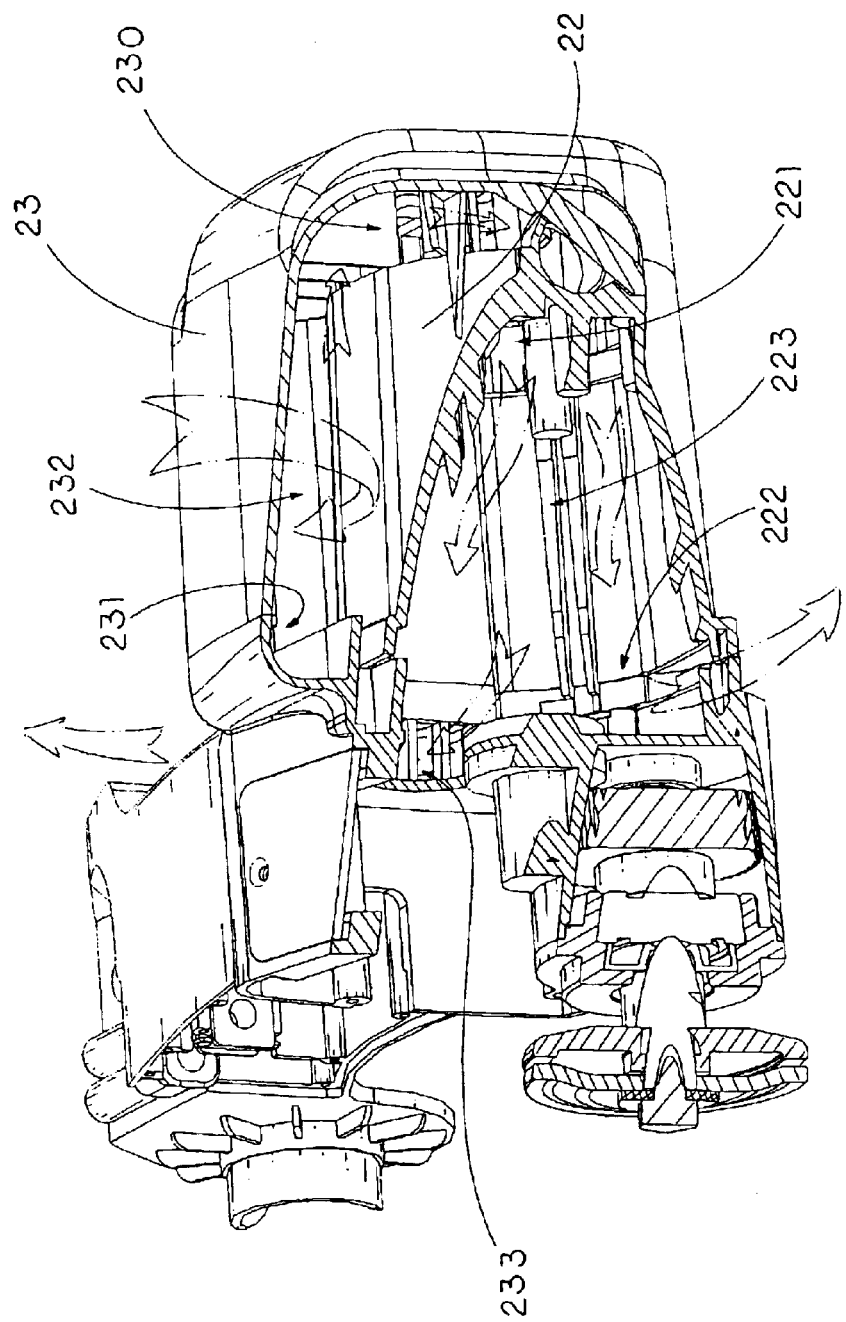
FIG. 6 is a sectional perspective view of a motor assembly of the environment control arrangement of the cutting machine according to the above preferred embodiment of the present invention, illustrating the directions of the intake fresh air and the discharged hot air without the sucking motor.
Figure 7:
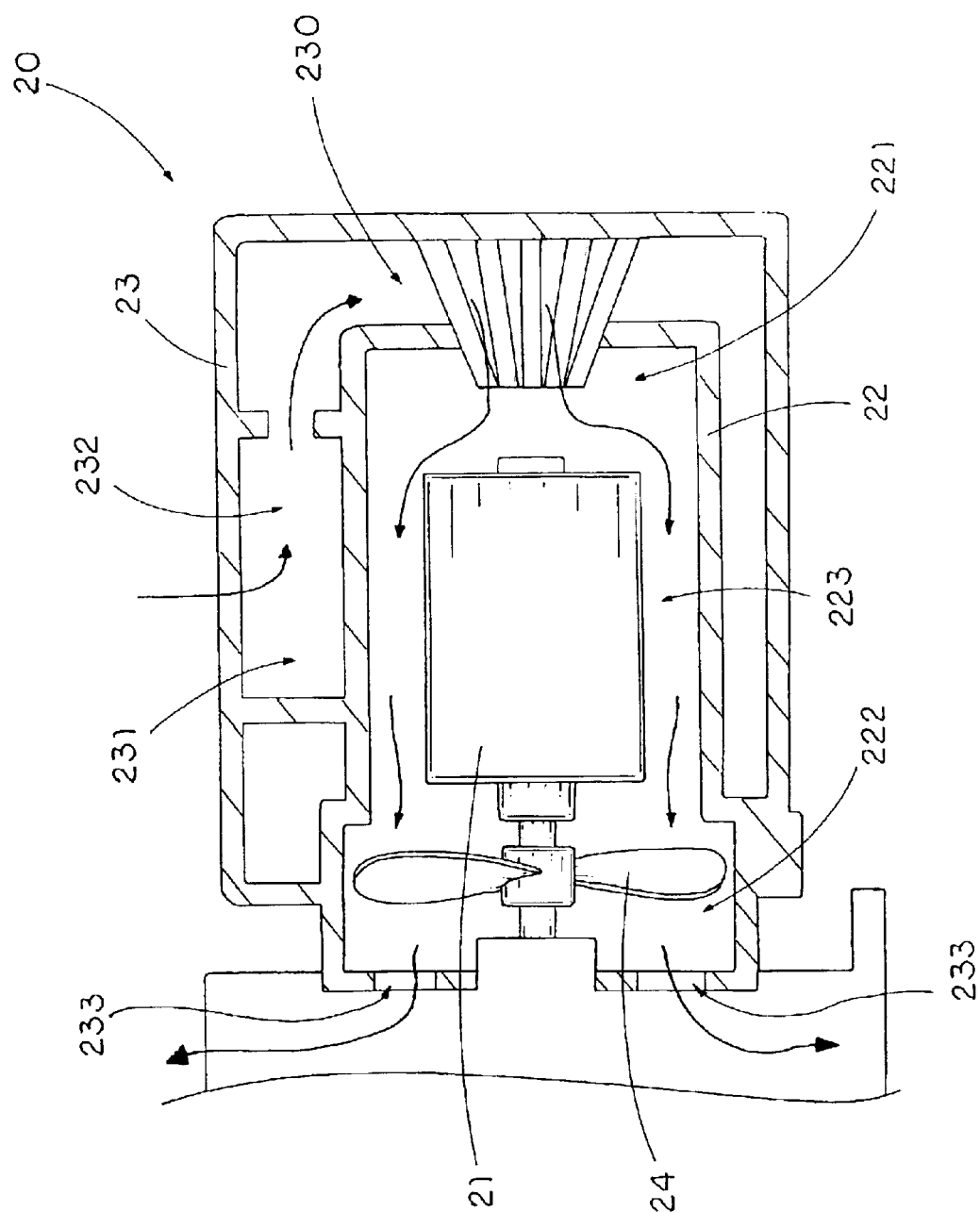
FIG. 7 is a sectional view of the motor assembly of the motor assembly of the environment control arrangement of the cutting machine according to the above preferred embodiment of the present invention.

As shown in FIGS. 6 and 7, the motor assembly 20 further comprises a motor case 22 having an open inlet end 221 at one side thereof and an open outlet end 222 at another opposed side to define a motor cavity 223 to dispose the driving motor 21, and a cooling fan 24 rotatably connected to the driving motor 21 within the motor cavity 223, so that when the cooling fan 24 is driven to rotate by the driving motor 21, the cooling fan 24 sucks in air through the open inlet end 21 of the motor case 22 and discharges the air through the open outlet end 222 thereof.

The motor assembly 20 further comprises an air intake hood 23 sheltering around the motor case 22 to define an air intake passage 231 between the air intake hood 23 and the motor case 22 to communicate with the open inlet end 221 of the motor case 22, wherein the air intake hood 23 has an air intake window 232 communicating the air intake passage 231 with outside and an air discharging slot 233 communicating with the open outlet end 222 of the motor case 22. Therefore, the air sucked by the cooling fan 24 via the air intake window 231, the air intake passage 231, and the open inlet end 221 to cool down the driving motor 21 is discharged through the air discharging slot 233.

Accordingly, a diameter of the motor case 22 is smaller than that of the air intake hood 23 in such a manner that when the motor case 22 is sheltered by the air intake hood 23, the air intake passage 231 is formed between a circumferential wall of the motor case 22 and a circumferential wall of the air intake hood 23.

Moreover, a width of the motor case 22 is shorter than that of the air intake hood 23 such that when the motor case 22 is encirclingly covered by the air intake hood 23, an air chamber 230 is defined at an inner side portion of the air intake hood 23 around the open inlet end 221 of the motor case 22.

FIG. 6 illustrates a structural relation between motor case 22 and the air intake hood 23 while the driving motor 21 and the cooling fan 24 are not installed into the motor case 22, wherein the FIG. 6 mainly illustrates the direction of the air sucking from the air intake window 232, passing through the motor cavity 223 and, discharging from the air discharging slot 233. As shown in FIG. 6, the air is sucked into the air intake passage 231 through the air intake window 232 and is detoured to the air chamber 230 so as to enter into the motor cavity 223 through the open inlet end 221 of the motor case 22.

Therefore, the sucking effect of the motor assembly 20 will be highly increased by generating a circulated motion of air cycle in the air intake hood 23 so that more air will be sucked into the motor cavity 223 through the air intake window 232 for dissipating the heat of the driving motor 21. In other words, the cooling effect of the motor assembly 20 will be highly increased to cool down the driving motor 21 so as to prolong the service life span thereof.

The air intake window 232 is formed at a mid-portion of the air intake hood 23 at a position between the open inlet end 221 and the open outlet end 222 of the motor case 22. Moreover, the air intake window 232 is positioned at an upper portion of the motor assembly 20 to suck the fresh air into the motor case 22 in order to lower the motor's noise and decrease the pollution of the motor's interior.

Moreover, an air filtering guide 25 is mounted on the air intake hood 23 at the air intake window 232 such that when the fresh air is sucked into the air intake passage 231 through the air intake window 232, the air filtering guide 25 functions as a first blockage to initially filter the fresh air so as to prevent the residual particles entering into the motor cavity 223.

FIG. 7 mainly illustrates the relationship between the driving motor 21 and cooling fan 24 within the motor cavity 223, so as to show the flow of fresh air passing therethrough. According to the preferred embodiment, the driving motor 21 is embodied as a universal motor, wherein the cooling fan 24 is positioned closed to the open outlet end 222 of the motor case 22 in such a manner that the heat generated by the driving motor 21 is sucked by the cooling fan 24 and dissipated by the flow of fresh air.

It should not be limited that the driving motor 21 is embodied as an induction motor wherein the cooling fan 24 is positioned closed to the open inlet end 221 of the motor case 22 to suck the fresh air towards the driving motor 21 for dissipating the heat thereof.

In view of above, the end collecting tray 41 is capable of effectively collecting the residual particles during the cutting process so as to stop the residual particles spreading in the surroundings. Then, the suction source 42 can collect all the residual particles within the collecting chamber 411. Moreover, the motor assembly 20 can prevent the residual particles from entering into the motor cavity 223 in order to prevent the driving motor 21 from being damaged by the residual particles. Therefore, the cutting machine can archive the environment control when the cutting machine incorporates with the environment control arrangement 40.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A cutting machine, comprising:

a cutting support frame comprising a bottom collecting tray and a cutting table mounted thereon for supporting a work piece;

a motor assembly, which is supported on said bottom collecting tray, comprising a driving motor and a driving shaft which is driven to be rotated by said driving motor;

a cutting head arrangement comprising a cutting blade coaxially mounted to said driving shaft at a position overhanging said cutting table, wherein said cutting blade has a cutting area defined at an outer circumferential portion thereof when said cutting blade cuts said work piece; and an environment control arrangement, comprising:

an end collecting tray, which is upwardly extended from said bottom collecting tray, having a collecting chamber for collecting residual particles of said work piece while said cutting blade cuts said work piece, wherein said end collecting tray is upwardly extended to a position above said cutting area of said cutting blade, wherein said end collecting tray has a concave reflecting surface to form said collecting chamber for collectively reflecting said residual particles when said residual particles spread towards said concave reflecting surface of said end collecting tray;

a suction source having a sucking inlet provided at a lower portion of said end collecting tray for collecting said residual particles within said collecting chamber by means of sucking effect; and a detouring guide for detouring said residual particles towards said sucking inlet of said suction source, wherein the detouring guide comprises a guider wall, having a plurality of guiding through grooves provided thereon, detachably mounted at an opening of said collecting chamber of said end collecting tray and a plurality of guiding fins rearwardly and inclinedly extended from said guider wall, wherein said guiding fins are capable of detouring said residual particles towards said sucking inlet when said residual particles spread towards said collecting chamber through said guiding through grooves.

2. The cutting machine, as recited in claim 1, wherein said suction source comprises a collection pen and means for sucking said residual particles from said sucking inlet to said collection pen.

3. The cutting machine, as recited in claim 2, wherein said collection pen comprises a standing frame having a top frame, a collecting bag having a top opening supported by said top frame of said standing frame to define a collection cavity within said collecting bag, and a cover guide which is supported on said top frame of said standing frame and comprises a plurality of dust guiders extended downwardly into said collection cavity, wherein said dust guiders are capable of guiding said residual particles into said collection cavity when said sucking means sucks said residual particles to said cover guide from said sucking inlet.

4. The cutting machine, as recited in claim 3, wherein a circumference of said cover guide is smaller than that of said top frame of said standing frame to define an air gap therebetween for allowing air escaping from said collection cavity to outside.

5. The cutting machine, as recited in claim 4, wherein said sucking means comprises a directing cylinder supported on said cover guide, an extension hose extended from said sucking inlet to said directing cylinder, and a suction motor operatively connected to said extension hose for reducing an air pressure at said sucking inlet so as to suck said residual particles into said collecting pen, wherein a diameter of said extension hose is smaller than that of said directing cylinder for slowing down a speed of said residual particles passing from said extension hose to said directing cylinder.

6. The cutting machine, as recited in claim 3, wherein said sucking means comprises a directing cylinder supported on said cover guide, an extension hose extended from said sucking inlet to said directing cylinder, and a suction motor operatively connected to said extension hose for reducing an air pressure at said sucking inlet so as to suck said residual particles into said collecting pen, wherein a diameter of said extension hose is smaller than that of said directing cylinder for slowing down a speed of said residual particles passing from said extension hose to said directing cylinder.

7. The cutting machine, as recited in claim 2, wherein said motor assembly comprises a motor case having an open inlet end at one side thereof and an open outlet end at another opposed side to define a motor cavity to dispose said driving motor, and a cooling fan rotatably connected to said driving motor within said motor cavity, so that when said cooling fan is driven to rotate by said driving motor, said cooling fan sucks in air through said open inlet end of said motor case and discharges said air through said open outlet end thereof, said motor assembly further comprising an air intake hood sheltering around said motor case to define an air intake passage between said air intake hood and said motor case to communicate with said open inlet end of said motor case, wherein said air intake hood has an air intake window communicating said air intake passage with outside and an air discharging slot communicating with said open outlet end of said motor case, whereby, said air sucked by said cooling fan via said air intake window, said air intake passage, and said open inlet end to cool down said driving motor is discharged through said air discharging slot.

8. The cutting machine, as recited in claim 7, wherein a width of said motor case is shorter than that of said air intake hood such that said motor case is encirclingly covered by said air intake hood to define an air chamber at an inner side portion of said air intake hood around said open inlet end of said motor case.

9. The cutting machine, as recited in claim 1, wherein said bottom collecting tray has a guiding channel protruding upwardly wherein said guiding channel has a slanted bottom sidewardly extended to said end collecting tray for guiding said residual particles towards said sucking inlet.

10. A cutting machine, comprising:

a cutting support frame comprising a bottom collecting tray and a cutting table mounted thereon for supporting a work piece;

a motor assembly, which is supported on said bottom collecting tray, comprising a driving motor and a driving shaft which is driven to be rotated by said driving motor;

a cutting head arrangement comprising a cutting blade coaxially mounted to said driving shaft at a position overhanging said cutting table, wherein said cutting blade has a cutting area defined at an outer circumferential portion thereof when said cutting blade cuts said work piece; and an environment control arrangement, comprising:

an end collecting tray, which is upwardly extended from said bottom collecting tray, having a collecting chamber for collecting residual particles of said work piece while said cutting blade cuts said work piece, wherein said end collecting tray is upwardly extended to a position above said cutting area of said cutting blade;

a suction source having a sucking inlet provided at a lower portion of said end collecting tray for collecting said residual particles within said collecting chamber by means of sucking effect; and a detouring guide for detouring said residual particles towards said sucking inlet of said suction source, wherein the detouring guide comprises a guider wall, having a plurality of guiding through grooves provided thereon, detachably mounted at an opening of said collecting chamber of said end collecting tray and a plurality of guiding fins rearwardly and inclinedly extended from said guider wall, wherein said guiding fins are capable of detouring said residual particles towards said sucking inlet when said residual particles spread towards said collecting chamber through said guiding through grooves.

11. A cutting machine, comprising:

a cutting support frame comprising a bottom collecting tray and a cutting table mounted thereon for supporting a work piece;

a motor assembly, which is supported on said bottom collecting tray, comprising a driving motor and a driving shaft which is driven to be rotated by said driving motor;

a cutting head arrangement comprising a cutting blade coaxially mounted to said driving shaft at a position overhanging said cutting table, wherein said cutting blade has a cutting area defined at an outer circumferential portion thereof when said cutting blade cuts said work piece; and an environment control arrangement, comprising:

an end collecting tray, which is upwardly extended from said bottom collecting tray, having a collecting chamber for collecting residual particles of said work piece while said cutting blade cuts said work piece, wherein said end collecting tray must be upwardly extended to a position above said cutting area of said cutting blade; and a suction source having a sucking inlet provided at a lower portion of said end collecting tray for collecting said residual particles within said collecting chamber by means of sucking effect, wherein said bottom collecting tray has a guiding channel protruding upwardly wherein said guiding channel has a slanted bottom sidewardly extended to said end collecting tray for guiding said residual particles towards said sucking inlet.

12. A cutting machine, comprising:

a cutting support frame comprising a bottom collecting tray and a cutting table mounted thereon for supporting a work piece;

a motor assembly, which is supported on said bottom collecting tray, comprising a driving motor and a driving shaft which is driven to be rotated by said driving motor;

a cutting head arrangement comprising a cutting blade coaxially mounted to said driving shaft at a position overhanging said cutting table, wherein said cutting blade has a cutting area defined at an outer circumferential portion thereof when said cutting blade cuts said work piece; and an environment control arrangement, comprising:

an end collecting tray, which is upwardly extended from said bottom collecting tray, having a collecting chamber for collecting residual particles of said work piece while said cutting blade cuts said work piece, wherein said end collecting tray must be upwardly extended to a position above said cutting area of said cutting blade, wherein said end collecting tray has a concave reflecting surface to form said collecting chamber for collectively reflecting said residual particles when said residual particles spread towards said concave reflecting surface of said end collecting tray; and a suction source having a sucking inlet provided at a lower portion of said end collecting tray for collecting said residual particles within said collecting chamber by means of sucking effect, wherein said bottom collecting tray has a guiding channel protruding upwardly wherein said guiding channel has a slanted bottom sidewardly extended to said end collecting tray for guiding said residual particles towards said sucking inlet.

* * * * *